United States Patent [19]

Beetcher et al.

[11] Patent Number: 5,933,497
[45] Date of Patent: Aug. 3, 1999

[54] APPARATUS AND METHOD FOR CONTROLLING ACCESS TO SOFTWARE

[75] Inventors: Robert Carl Beetcher; Michael Joseph Corrigan; Francis Joseph Reardon, Jr., all of Rochester; James William Moran, Eyota, all of Minn.

[73] Assignee: International Business Machines Corporation, Armonk, N.Y.

[21] Appl. No.: 08/011,042

[22] Filed: Jan. 29, 1993

Related U.S. Application Data

[63] Continuation of application No. 07/629,295, Dec. 14, 1990, abandoned.

[51] Int. Cl.$^6$ .................................................. H04L 9/00
[52] U.S. Cl. ........................... 380/4; 380/9; 380/21; 380/23; 380/25; 380/49; 380/50
[58] Field of Search ............................. 380/4, 9, 20, 21, 380/23, 25, 43, 44, 49, 50

[56] References Cited

U.S. PATENT DOCUMENTS

| | | | |
|---|---|---|---|
| 3,609,697 | 9/1971 | Blevins et al. | 364/200 |
| 4,433,207 | 2/1984 | Best | 380/4 |
| 4,471,163 | 9/1984 | Donald | 380/4 |
| 4,683,553 | 7/1987 | Mollier | 380/4 |
| 4,685,055 | 8/1987 | Thomas | 364/200 |
| 4,866,769 | 9/1989 | Karp | 380/4 |
| 4,903,296 | 2/1990 | Chandra et al. | 380/4 |
| 4,932,054 | 6/1990 | Chou et al. | 380/4 |
| 4,959,861 | 9/1990 | Howlette | 380/4 |

*Primary Examiner*—Bernarr E. Gregory
*Attorney, Agent, or Firm*—Roy W. Truelson

[57] ABSTRACT

Software is distributed without entitlement to run, while a separately distributed encrypted entitlement key enables execution of the software. The key includes the serial number of the computer for which the software is licensed, together with a plurality of entitlement bits indicating which software modules are entitled to run on the machine. A secure decryption mechanism contained on the computer fetches its serial number and uses it as a key to decrypt the entitlement information, which is then stored in a product lock table in memory. The distributed software contains a plurality of entitlement verification triggers. Each trigger is a single machine instruction in the object code, identifying a product number of the software module. When a trigger is encountered during execution, the computer checks the product lock table entry corresponding to the product number of the software. If the product is entitled to run, execution continues normally; otherwise execution is aborted. Because this verification involves only a single machine instruction, it can be done with virtually no impact to overall system performance. As a result, it is possible to place a substantial number of such entitlement verification triggers in the object code, making it virtually impossible for someone to alter the code by "patching" the triggers. The triggering instruction may alternatively perform some useful work in parallel with entitlement verification.

26 Claims, 10 Drawing Sheets

APPARATUS AND METHOD FOR CONTROLLING ACCESS TO SOFTWARE

This application is a continuation of Ser. No. 07/629,295, filed Dec. 14, 1990, now abandoned.

FIELD OF THE INVENTION

The present invention relates to computer software usage, and in particular to restricting the ability of a computer user to use licensed software in a manner inconsistent with the license.

BACKGROUND OF THE INVENTION

A modern computer system is an enormously complex machine, incorporating the results of countless hours of engineering and programming skill in its design. A computer system contains many elements, but these may generally be broken down into hardware and software. Hardware is the tangible circuits, boards, cables, storage devices, enclosures, etc. that make up the system. But the hardware, in and of itself, can not solve problems in the real world, any more than a typewriter can compose a Pulitzer-winning play. The hardware requires instructions which tell it what to do. In it purest form, "software" refers to these instructions which make the hardware perform useful work (although it is sometimes loosely applied to the media on which software is stored and distributed). Like hardware, software is the product of human ingenuity. High quality software requires considerable creativity, training and intelligence on the part of the creator, also known as the programmer. Universities offer courses of instruction in "computer science" and similar disciplines, for the purpose of teaching people the art of creating software. An entire industry, encompassing thousands of careers, has grown up to create software which performs useful work. As a result of the extensive effort that can be expended in the development of software, it is not uncommon for the value of the software which is part of a computer system to exceed the value of the hardware.

One of the characteristics of a modern computer system is its ability to transmit and copy data with great speed and ease. In general, this is a necessary and beneficial capability. But it also means that software which may have taken years of creative effort to develop can be replicated in a fraction of a second on relatively inexpensive magnetic media, a capability which can be abused. Unauthorized persons can, with little cost or effort, replicate valuable software. This practice is generally known as software piracy. In recent years, various laws imposing criminal and civil liabilities have been enacted to curb software piracy. However, given the relative ease with which one may copy software, and the temptation to do so which arises from the value of the software, software piracy remains a problem.

In the case of inexpensive mass distributed software for small computers known as "personal computers", it is common to license the software for a fixed one-time charge which is the same for all customers. This is less practical for large mainframe computer systems. Software for such systems can involve millions of lines of code, requiring a very large investment to develop and maintain. A single fixed one-time charge sufficient for the developer to recoup this investment is likely to be prohibitively expensive for many smaller users. Therefore, it is common in the mainframe environment to charge license fees for software based on usage. On such method, known as "tiered pricing", involves charging according to a variable fee scale based on the capability of the customer's machine. The customer with a faster machine, with more terminals attached, will pay a higher license fee for the same software than a customer with a less capable machine. Another common practice is to charge separately for maintenance upgrades of the software.

Given the level of expertise required to create quality software, and the amount of time and effort that must be expended, creation of such software requires money. If software developers are not paid proportionate to their training and effort, it will not be possible to find people to create software. It is not merely a practical imperative that the investment in software made by its developers be protected, but a moral one as well. Legitimate owners of software have therefore sought to develop ways to distribute software which will make it difficult to use the software in an unauthorized manner, and ensure that software developers are fairly compensated for their products.

Software may be distributed by the legitimate owner in a number of different ways. From the standpoint of preventing unauthorized use, these distribution methods may broadly be classified in three groups: unrestricted entitlement methods, restricted entitlement methods, and non-entitlement methods.

Unrestricted entitlement means that the software as distributed will run on any machine for which it was designed, without restriction. An owner distributing software with unrestricted entitlement must distribute to each user only the software which that user has paid for and is entitled to run. Apart from legal and contractual obligations, there is nothing to prevent the recipient of such software from copying or using it in an unauthorized manner. For inexpensive software which is licensed for a one-time charge, such as that used on most personal computers, this is the most common method of distribution.

Restricted entitlement means that the software contains some built-in restriction, limiting the ability of a user to copy and run it on any number of machines. There are several varieties of restricted entitlement methods. One of these is copy protection, which restricts the number of copies that can be made from the distributed original. While it achieves some level of protection from software piracy, copy protection has certain disadvantages. Like unrestricted entitlement, copy protection requires that the owner distribute to each user only the software that the user is entitled to run. It is not foolproof, and some programs exist which can make literal copies of copy protected software, defeating the protection mechanism. Finally, it interferes with the user's ability to make legitimate copies for backup purposes or to run the software from a fast storage device. Another restricted entitlement method is to encode user or machine specific information in the software itself. When the software is run, the machine will perform a check to make sure the software is authorized for that machine or user. This method achieves protection without interfering with the user's ability to make legitimate copies. However, it requires a very expensive distribution system, since each copy of the distributed software must be uniquely compiled, placed on distribution media, and shipped.

Non-entitlement means that the software as distributed is disabled, and requires a separately distributed authorization to be able to run. A non-entitlement method has the potential of avoiding customized software distribution entirely, although not all such methods have this capability. For example, the owner can distribute the same set of multiple software programs on a single generic medium to all its customers, and separately distribute individualized authorization keys to the each customer which allow the customer to run only those programs he has paid for. While non-entitlement methods avoid many of the problems associated with other methods, current designs suffer a high exposure to fabricated entitlement or significant performance degradation. In most cases, the mechanism used to withhold entitlement to run the software requires that the provision for entitlement verification be centralized in the software module (either as data or instructions), to avoid performance degradation overhead of the verification. In some cases, this entitlement overhead is due to the size of the product identifier and the packaging of protection routines within the distributed software. In other cases, the overhead is due to the need to perform complicated decode procedures while running the software. As a result of this centralization of the entitlement check, it is relatively easy for an experienced programmer to nullify the protection mechanism by "patching", i.e., modifying a small, selected portion of the object code. In another case, the object code doesn't provide for entitlement verification, but a secure call path does, which identifies the module by producing a bit signature from it. While this avoids exposure to patching, it unavoidably causes severe performance degradation of the call mechanism.

The protection methods taught by prior art involve trade-offs between level of protection and ease of use. It is possible to obtain a relatively high level of protection by encoding machine specific information in the software, but at a cost of maintaining a very complex distribution system in which each distributed copy of the software is unique. Less costly distribution is possible, but at the expense of losing some of the protection. A need exists for a method which achieves a high level of protection, can be easily distributed using mass distribution techniques, and does not unduly interfere with system performance, the user's ability to make legitimate back-up copies, or other necessary functions. At the same time, there is a need for a method which supports tiered pricing, and separate licensing fees for different versions of a software product.

It is therefore an object of the present invention to provide an enhanced method and apparatus for controlling the use of software in a computer system.

Another object of this invention is to provide a greater level of protection against unauthorized use of software in a computer system.

Another object of this invention is to reduce the cost of protecting software against unauthorized use.

Another object of this invention is to increase the performance of a computer system running software which is protected against unauthorized use.

Another object of this invention is to simplify the distribution system of a distributor of software protected against unauthorized use.

Another object of this invention is to provide a method and apparatus of protecting software from unauthorized use which reduces the impact of such protection on legitimate uses of the software.

Another object of this invention is to provide an enhanced method and apparatus of protecting software from unauthorized use while allowing the user to make legitimate back-up copies of the software.

Another object of this invention is to make it more difficult to alter software in a manner that will enable unauthorized use.

Another object of this invention is to provide an enhanced method and apparatus for distributing tier-priced software.

SUMMARY OF THE INVENTION

Software is distributed according to the present invention without entitlement to run. A separately distributed encrypted entitlement key enables execution of the software. The key includes the serial number of the machine for which the software is licensed, together with a plurality of entitlement bits indicating which software modules are entitled to run on the machine. A secure decryption mechanism is contained on the machine. The decryption mechanism fetches the machine serial number and uses it as a key to decrypt the entitlement key. The entitlement information is then stored in a product lock table in memory.

The distributed software contains a plurality of entitlement verification triggers. In the preferred embodiment, each trigger is a single machine instruction in the object code, identifying a product number of the software module. When such a triggering instruction is encountered during execution of the software module, the machine checks the product lock table entry corresponding to the product number of the software module. If the product is entitled to run, execution continues normally; otherwise execution is aborted. Because this verification involves only a single machine instruction, it can be done with virtually no impact to overall system performance. As a result, it is possible to place a substantial number of such entitlement verification triggers in the object code, making it virtually impossible for someone to alter the code by "patching" the triggers. In an alternative embodiment, the triggering instruction also performs some useful work necessary for the software module to properly execute. This renders the software even more difficult to "patch", and further reduces the impact to performance of such verification triggers.

Because the software itself does not contain any entitlement, no restrictions on the distribution are necessary. In the preferred embodiment, the distributor of software may record multiple software modules on a single generic medium, and distribute the same recorded set of modules to all its customers. Each customer will receive a unique entitlement key, enabling the customer to run only those software modules to which he is licensed. It makes no difference that the customer is given some modules to which he is not licensed, as he will be unable to execute them without the appropriate key. The customer may freely load the software onto other storage devices in his system, or make any number of back-up copies of the software.

DETAILED DESCRIPTION OF THE PREFERRED EMBODIMENT

Figure 1:
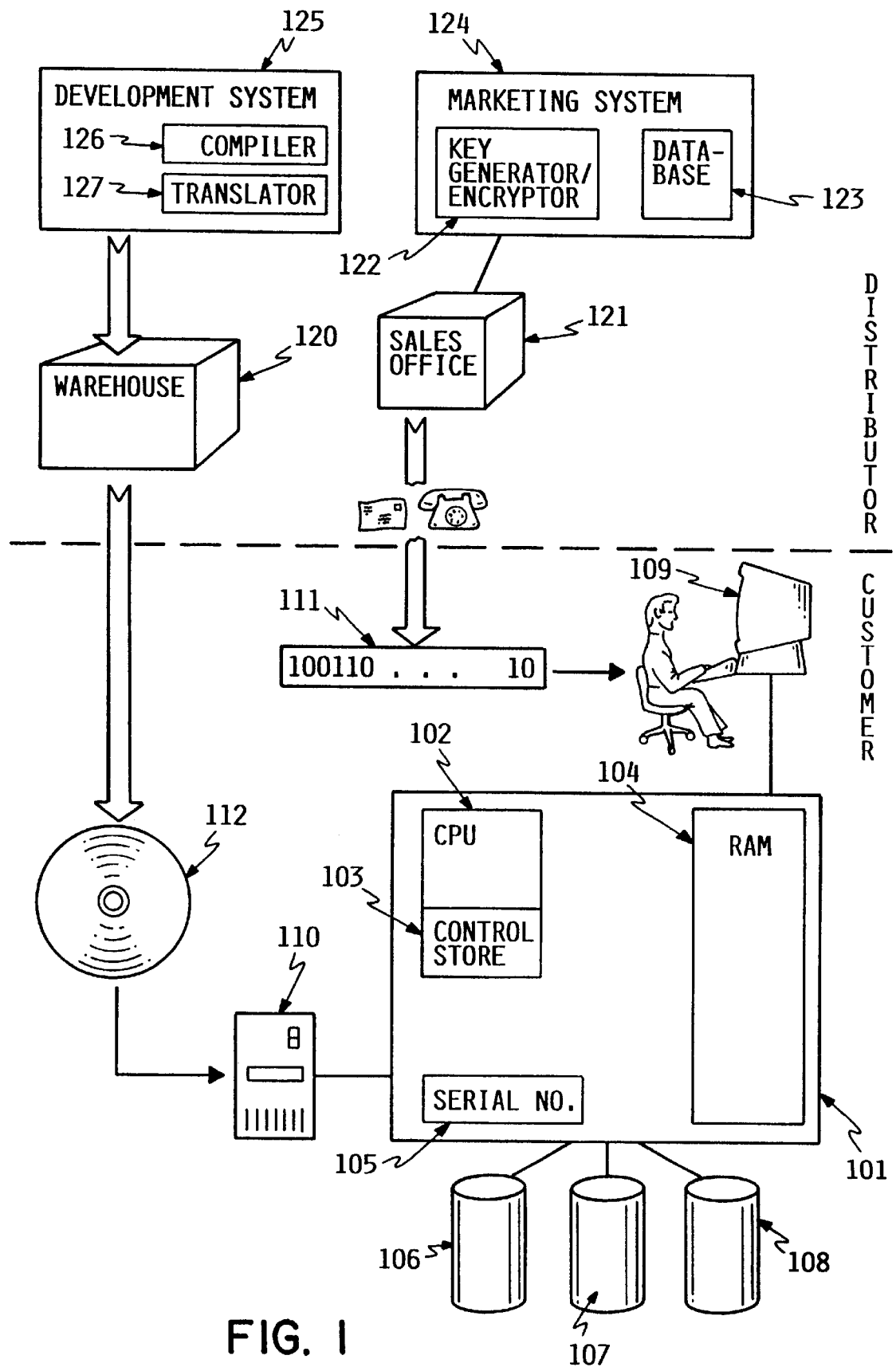
FIG. 1 shows the major components of a software protection mechanism according to the preferred embodiment of this invention.

A diagram of the major components of a software protection mechanism according to the preferred embodiment of the present invention is shown in FIG. 1. A customer's computer system 101 comprises a central processing unit (CPU) 102 tightly coupled to control store 103, a random access system memory 104, a non-erasable electronically readable unique identifier 105, and a plurality of storage devices 106, 107, 108. In the preferred embodiment, unique identifier 105 is a machine serial number. In the preferred embodiment, storage devices 106–108 are rotating magnetic disk drive storage units, although other storage technologies could be employed. Computer system 101 also comprises an operator console 109 through which it can receive input from an operator, and a unit for reading software media 110. While one operator console, one unit for reading software media, and three storage units are shown in FIG. 1, it should be understood that the actual number of such devices attached to system 101 is variable. It should also be understood that additional devices may be attached to system 101. In the preferred embodiment, computer system 101 is an IBM AS/400 computer system, although other computer systems could be used.

Software modules are distributed separately from the entitlement keys required to operate them. The software modules are originally created on development computer system 125, which contains compiler 126 and translator 127. The software modules are recorded on software recording media 112 and stored in warehouse 120, from which they are distributed to the customer. Encrypted entitlement key 111 is distributed from a sales office 121 of the distributor. Sales office 121 has access to marketing computer system 124, comprising an entitlement key generator/encrypter 122 and a database 123 containing customer information. In particular, database 123 contains machine serial numbers and processor types necessary for generation of the encrypted entitlement key. In the preferred embodiment, marketing system 124 is a centrally located computer communicating with a plurality of sales offices. However, system 124 could in the alternative be located at the sales office itself, accessing a local or centralized database. While two separate computer systems 124,125 under the control of the distributor are shown, it should be understood that systems 124 and 125 could physically be a single computer system performing both functions.

Encrypted entitlement key 111 is sent from the software distributor to the customer by mail, telephone, or other appropriate means. While it is possible to transmit the key electronically or on magnetic media such as a diskette, the key is sufficiently brief that an operator can enter it into system 101 by typing the key on console 109.

In the preferred embodiment, multiple software modules are distributed on the same media 112. The distributor may independently grant entitlement to use each module via the entitlement key. Warehouse 120 stocks a generic set of software modules on media 112. Each customer is shipped the same generic set of software modules, irrespective of which ones the customer is licensed to use. The separately distributed entitlement key contains information enabling system 101 to determine which software modules are entitled to execute on it.

In the preferred embodiment, software media 112 comprise one or more optical read/only disks, and unit 110 is an optical disk reader, it being understood that electronic distribution or other distribution media could be used. Upon receipt of software media 112, the customer will typically load the desired software modules from unit 110 into system 101, and store the software modules on storage devices 106–108. The customer may create one or more back-up copies of the software modules on any suitable media, and store these in an archive. Software media 112 contains no restriction on copying or loading into the system, and is freely copyable and loadable.

Figure 2:
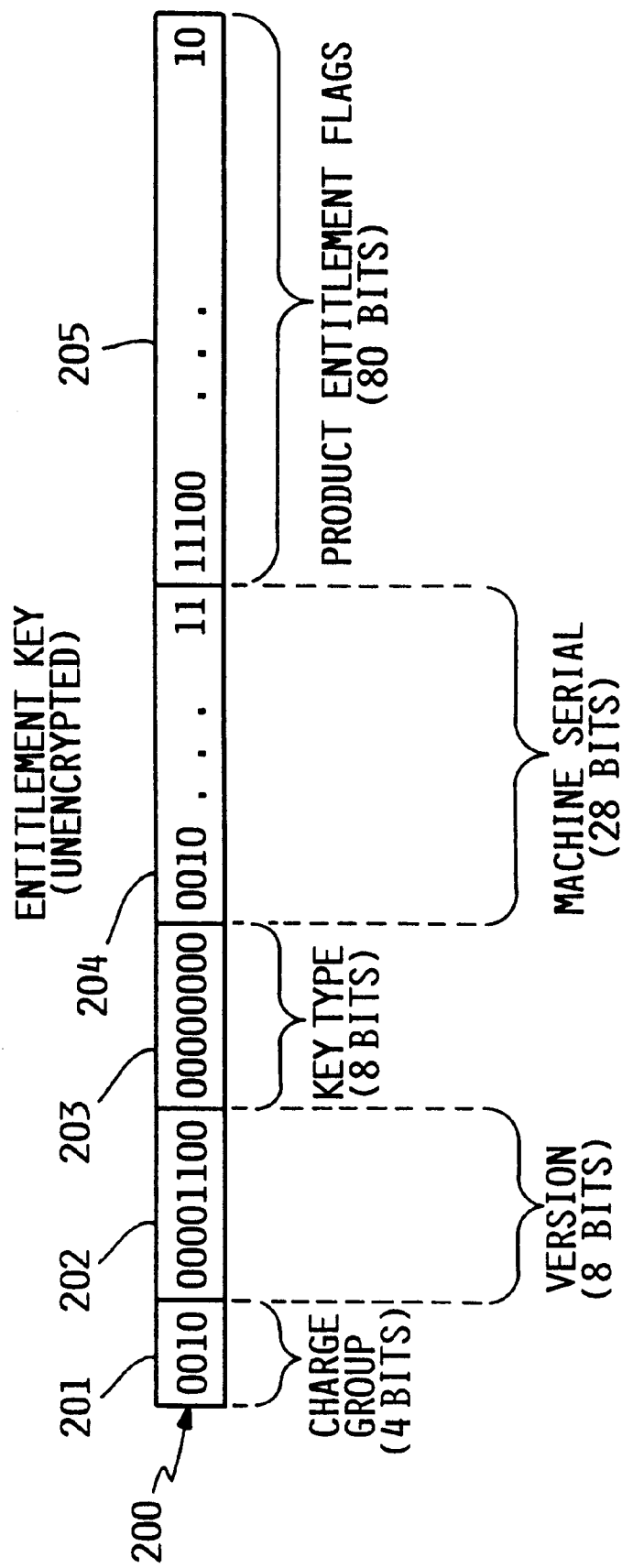
FIG. 2 shows the unencrypted contents of an entitlement key according to the preferred embodiment of this invention.

The contents of entitlement key 200 before encryption according to the preferred embodiment are shown in FIG. 2. The key contains charge group field 201, software version field 202, key type field 203, machine serial number field 204, and product entitlement flags 205. Charge group 201 specifies one of 16 possible machine tier values, and is used for supporting tier pricing of software. Software version 202 specifies the version level of the software which is entitled. It is anticipated that separate charges may be imposed for maintenance upgrades of software. The version 202 specified in the key 200 will entitle software at that version level and all previous (lower) levels. Key type field 203 is a reserved area for future changes to the key format, key chaining, or for an extension of the number of different product supported. Machine serial number field 204 contains the serial number of the machine for which the entitlement key is intended. Product entitlement flag 205 is an 80-bit field containing 80 separate product flags, each corresponding to a product number. The bit is set to '1' if the corresponding product number is entitled; otherwise it is set to '0'.

Figure 3:
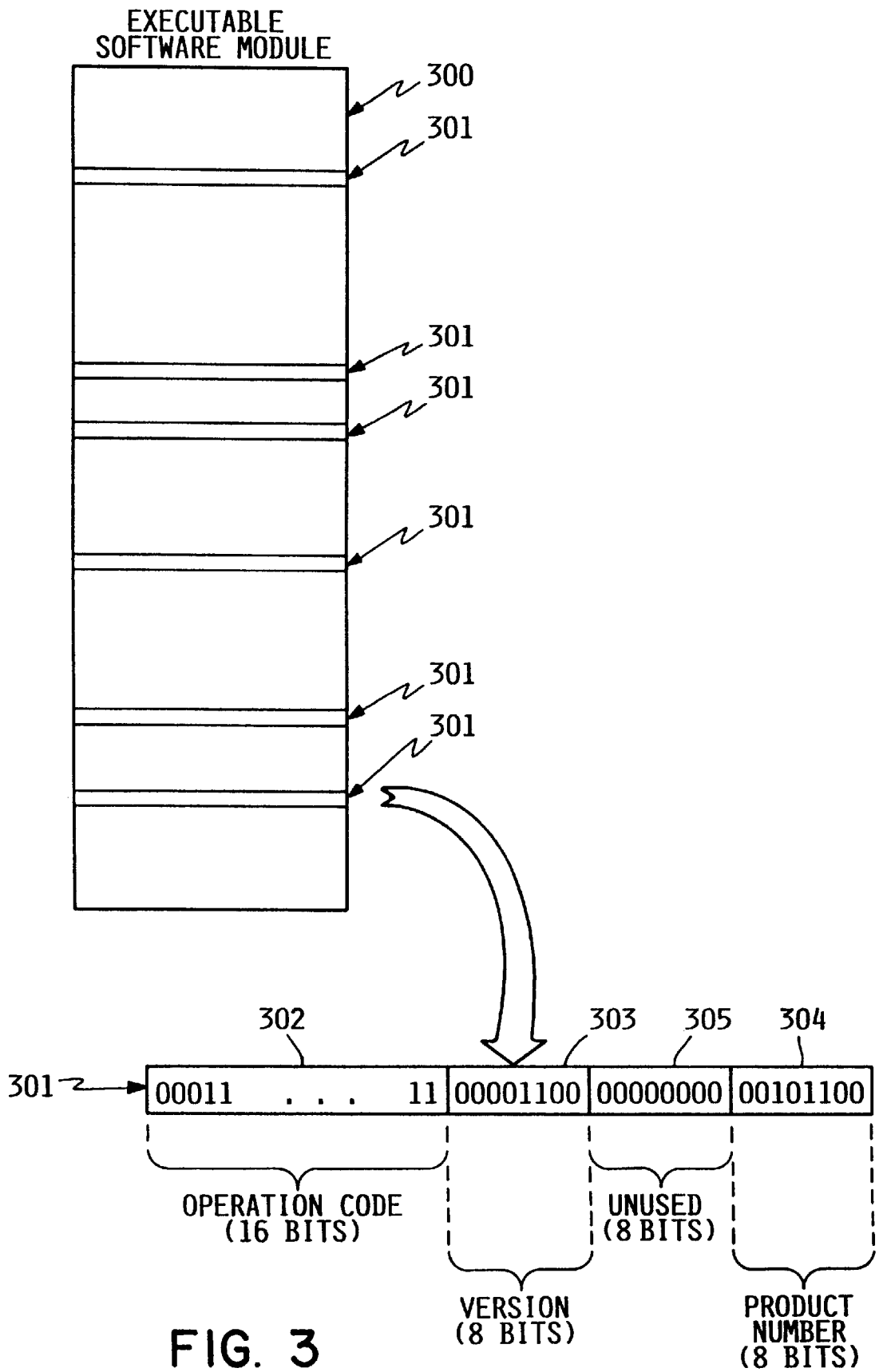
FIG. 3 shows the contents of a typical executable software module according to the preferred embodiment.

In the preferred embodiment, software modules are distributed as compiled object code. A typical software module 300 is shown in FIG. 3. The software module comprises a plurality of object code instructions capable of executing on computer system 101. According to this invention, a number of entitlement verification triggering instructions 301 are embedded in the object code. All triggering instructions 301 contained within a software module are identical. Triggering instruction 301 comprises operation code field 302, version field 303, and product number field 304. Field 305 is unused. Operation code 302 is the verb portion of the object code instruction, identifying the operation to be performed. Version 303 identifies the version level of the software module. Product number 304 identifies the product number associated with the software module. A single operation code is used for all triggering instructions, although the version and product number information may vary from module to module. In an alternative embodiment, the triggering instruction is also a direct instruction to perform some other useful work (from among those instructions which do not require that an operand for the action be specified in the instruction). In this alternative embodiment, execution of the triggering instruction causes system 101 to perform some other operation simultaneously with the entitlement verification.

Figure 4:
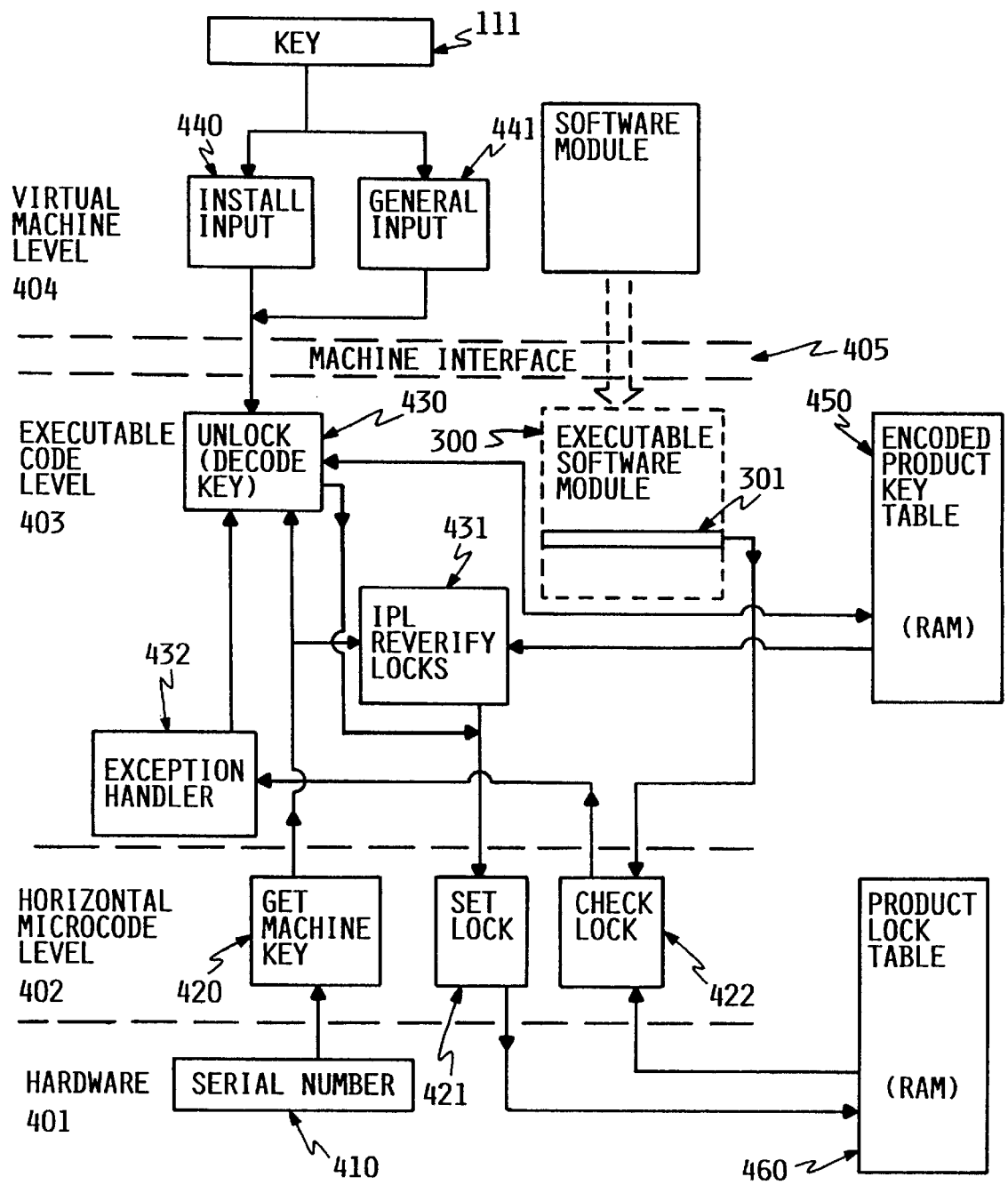
FIG. 4 shows the hardware and software structures required on the customer's computer system to support the software protection mechanism according to the preferred embodiment.

Computer system 101 contains means for receiving and decoding encrypted entitlement key 111 as well as means for verifying that the system has entitlement to execute a software module in response to a triggering instruction. In the preferred embodiment, these functions are divided among different levels of system hardware and software as shown in FIG. 4. In this embodiment, system 101 comprises four levels of hardware/software function: hardware level 401, horizontal microcode level 402, executable code level 403, and virtual machine level 404. Machine interface 405 separates the virtual machine level from all lower levels. Machine interface 405 is the lowest level interface defined to the customer, i.e., the instruction set at the virtual machine level is defined to the customer, but operations at lower levels are not. The customer therefore lacks capability to directly alter instructions below the machine interface level. A permanent, unalterable machine serial number 410 is contained at hardware level 401.

Horizontal microcode 402 contains microcode entries interpreting the executable instruction set. It is physically stored in control store 103, which in the preferred embodiment is a read-only memory (ROM) which is not capable of alteration by the customer. Entries in horizontal microcode support get machine key 420, set lock 421, and check lock 422 functions. Get machine key function 420 fetches a unique identifier, which in the preferred embodiment is based on the system serial number, from some permanent hardware location. Set lock function 421 accesses product lock table 460 and alters an entry in the table. The set lock function is the only microcode function capable of altering product lock table 460. Check lock function 422 accesses product lock table 460 and reads one of the entries to verify entitlement.

Executable code level 403 contains low level supervisory support and the support which implements instructions defined at the machine interface. It is physically stored in memory, but because the internal specifications are not defined to the customer, it is for all practical purposes not capable of being altered by the customer. Low level support includes unlock routine 430, IPL reverify locks routine 431, and exception handler 432. Unlock routine 430 uses the unique machine key to decodes entitlement key 111, and stores encrypted entitlement key 111 in encoded product key table 450. IPL reverify locks routine 431 fetches the contents of encoded product key table 450 to rebuild product lock table 460 when the system is re-initialized. Exception handler 432 responds to exception conditions raised by functions in horizontal microcode 402. Executable code level 403 additionally contains the object code form of software module 300.

Virtual machine level 404 refers to software as it is represented in terms of machine instructions. The machine at this level acts as a virtual machine in the sense that the machine instructions are not directly executable. Because the machine level is the lowest level of interface available to a customer, a nontraditional compilation path is required to produce an object code form of a module which can be executed on the system. This compilation process is described in a later paragraph. Although, in the truest sense, software which is produced through this nontraditional compilation path must take form as executable object code to be executed, it is normally and more clearly discussed in terms of its representation in machine instructions at the virtual machine level as if the machine instructions were directly executable. With this established, we can then say that virtual machine level 404 contains compiled user software. It also includes the higher level operating system support for system 101. This operation system support at virtual machine level 404 contains two user interface routines needed to support input of the entitlement key. General input routine 441 is used to handle input during normal operations. In addition, special install input routine 440 is required to input the key during initial installation of the operating system. This is required because that part of the operating system above machine interface level 405 is treated for purposes of this invention as any other program product; it will have a product number and its object code will be infected with entitlement verification triggers. Install input routine 440 is the only part of the operating system which will not have entitlement verification triggers, thereby allowing the entitlement key to be input when the system is originally installed.

Software module 300 is part of a program product in compiled object code form which executes on system 101. It exists as an entity in virtual machine level 404 in the sense that it is accessible to other objects in this level. However, the actual executable code operates at executable code level 403, as shown by the box in broken lines. The executable code contains entitlement verification triggering instructions 301 (only one shown), which are executed by horizontal microcode check lock function 422.

Figure 5:
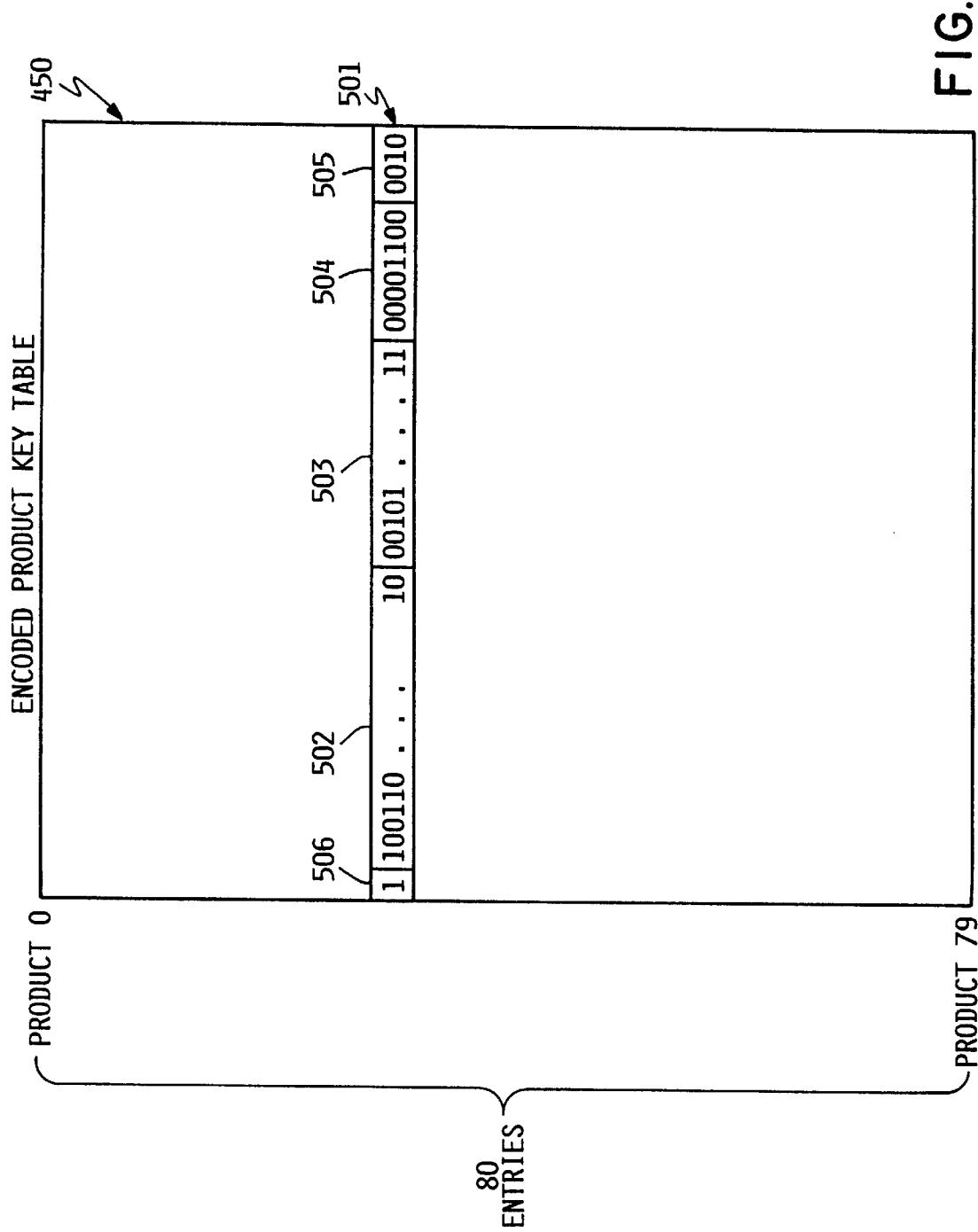
FIG. 5 shows the format of the encoded product key table according to the preferred embodiment.

Encoded product key table 450 is shown in FIG. 5. The table is contained in random access memory 104, and duplicated on a non-volatile storage device so it can be recovered if the system must be powered down or otherwise re-initialized. Table 450 contains 80 entries 501, one corresponding to each possible product number. Each entry 501 comprises a complete copy of the encrypted entitlement key 502 applicable to the product number of the entry, a date/time stamp 503 indicating when the key was first used, a version number 504 of the key, a charge group 505 of the key, and an entitlement bit 506 indicating whether the key unlocks the product. Date/time stamp 503 may be encrypted. Version number 504, charge group 505 and entitlement bit 506 repeat information contained in encrypted key 501. They are contained in the table to support queries. However, no entry in product lock table 460 can be altered, granting entitlement for a program to execute, without first verifying the information in encrypted key 502. Because each key 502 in product key table 450 is in its encrypted form, no special measures are required to prevent user access to the table.

Figure 6:
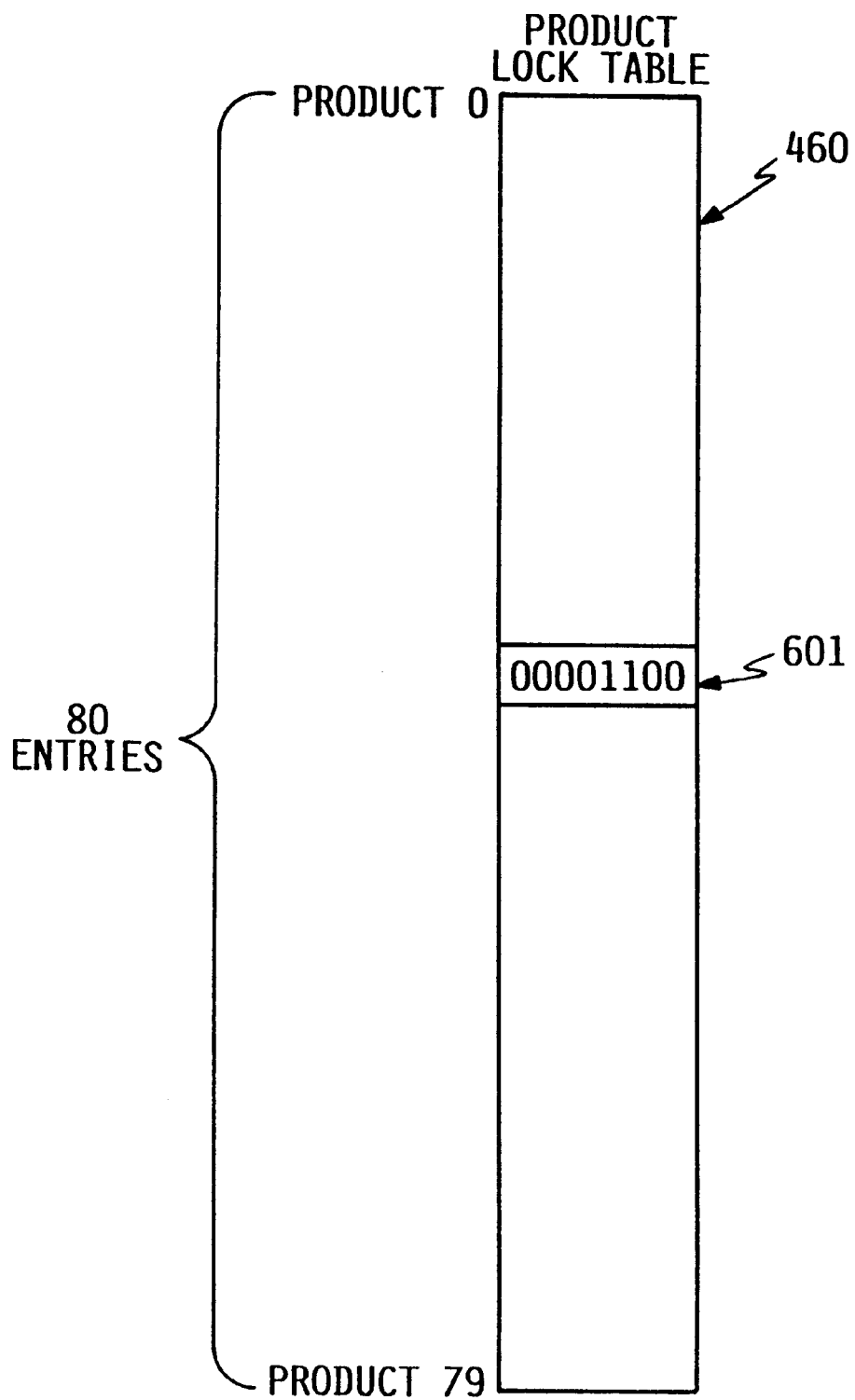
FIG. 6 shows the format of the product lock table according to the preferred embodiment.

Product lock table 460 is shown in FIG. 6. This table is contained in a special low address range of random access memory 104, which is under complete control of horizontal microcode. Table 460 contains 80 entries 601, one corresponding to each possible product number. Each entry contains a version number indicating the maximum version level of entitlement. A version number of 0 indicates no entitlement to any version of the product. The version number may be scrambled to add another degree of protection against alteration of table 460.

The operation of a software module on computer system 101 in accordance with the preferred embodiment of the present invention will now be described. There are four parts to this operation. In the first part, a plurality of entitlement verification triggering instructions are placed in the executable object code form of the software module. In the second part, an encrypted entitlement key 111 authorizing access to the software module is generated. In the third part, computer system 101 receives, decodes and stores entitlement key 111, and sets product lock table 460. In the fourth part, the software module executing on system 101 causes system 101 to verify entitlement upon encountering an entitlement verification instruction. The first two parts are performed under the control of the software distributor. The last two are performed on the customer's system 101.

Figure 7:
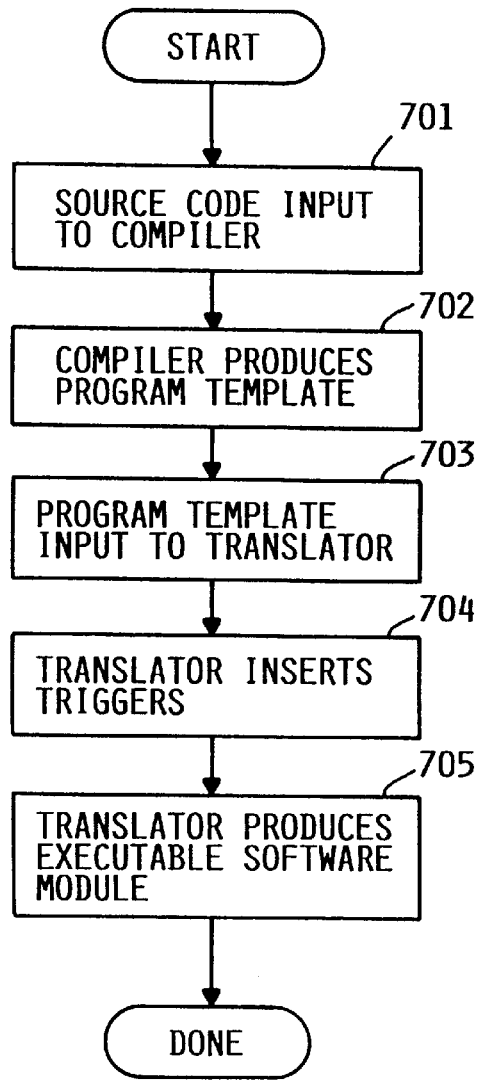
FIG. 7 is a block diagram of the steps required to place authority verification triggers in a software module, according to the preferred embodiment.

When the software distributor compiles a software module, it must place the entitlement verification triggers in object code. A typical such process, which takes place on development system 125, is shown in FIG. 7. Source code is generated by a programmer in the normal fashion, without inclusion of entitlement verification triggers. The source code is input into compiler 126 at step 701 to produce a program template at 702. The program template comprises machine instructions at virtual machine level 404 (i.e. above machine interface 405). The program template serves as input to translator 127 at step 704, along with its product number and version number identification. Translator 127 automatically generates a substantial number of entitlement verification triggers, inserts them in random locations in the object code, and resolves references after the triggers have been inserted. The resultant executable object code form of the software module which is output at 705 contains the embedded triggers. This executable form of the module comprises object code instructions at executable code level 403.

Figure 8:
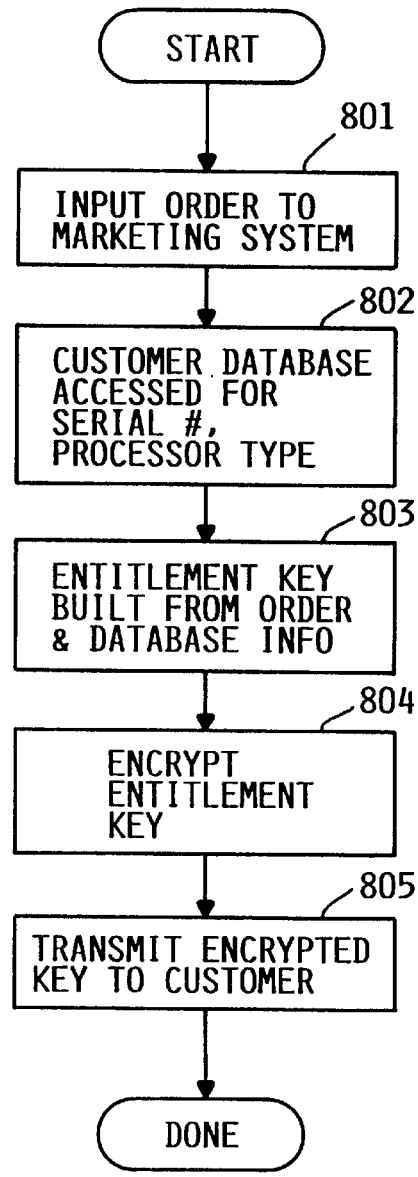
FIG. 8 is a block diagram of the steps required to generate an encrypted entitlement key according to the preferred embodiment.

The process for generating an encrypted entitlement key is shown in FIG. 8. An order for licenses to one or more program products at some version level generated by a sales representative is input to marketing computer system 124 at step 801. In theory, the customer could order products at multiple version levels, although there is generally little reason for him to do so. However, since each entitlement key operates at only a specified version level, a separate key would have to be generated for each different version level ordered by the customer. Upon receipt of the customer's order, key generator/encryptor 122 executing on system 124 would access database 123 containing information about the customer, particularly the serial number and processor type of his machine, at step 802. This information is used to generate charge group field 201 and machine serial number field 204 of the unencrypted entitlement key 200. The remaining fields are generated by reference to the customer order and a database of possible product number offerings, building the complete unencrypted key at step 803. Key generator/encryptor 122 then encrypts the key, using any of a number of encryption techniques known in the art, at step 804. The resultant encrypted entitlement key 111 is then transmitted to the customer at step 805. Although key 111 is shown in FIG. 1 as a plurality of binary bits, it may be presented to the customer in some other form, such as hexadecimal digits or alphanumeric equivalents of groups of binary bits, in order to simplify the task of entering the key from a keyboard.

Figure 9A:
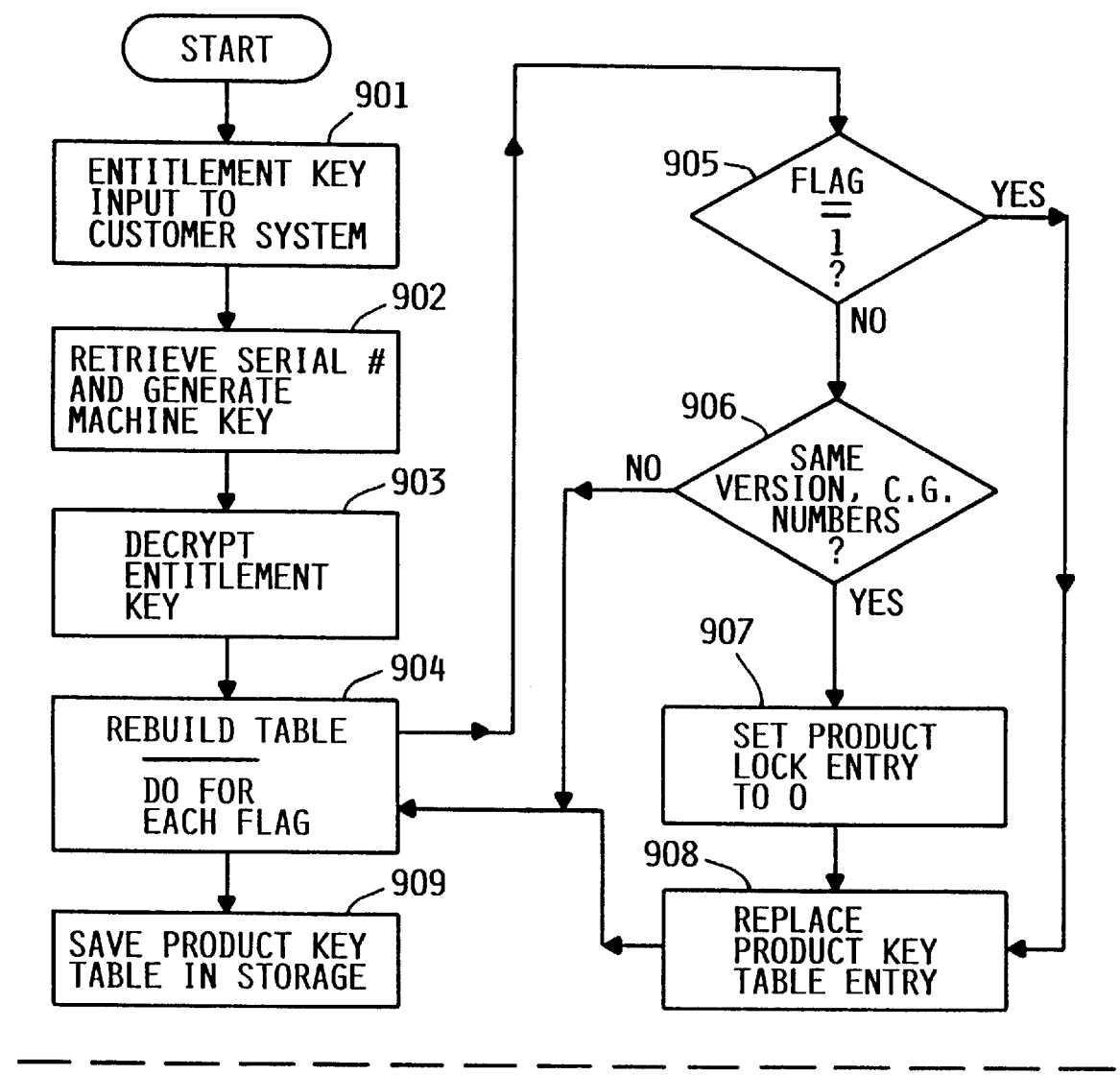
FIG. 9 is a block diagram of the steps required to decode an entitlement key and maintain a record of entitlement status on the customer's computer system, according to the preferred embodiment.
Figure 9B:
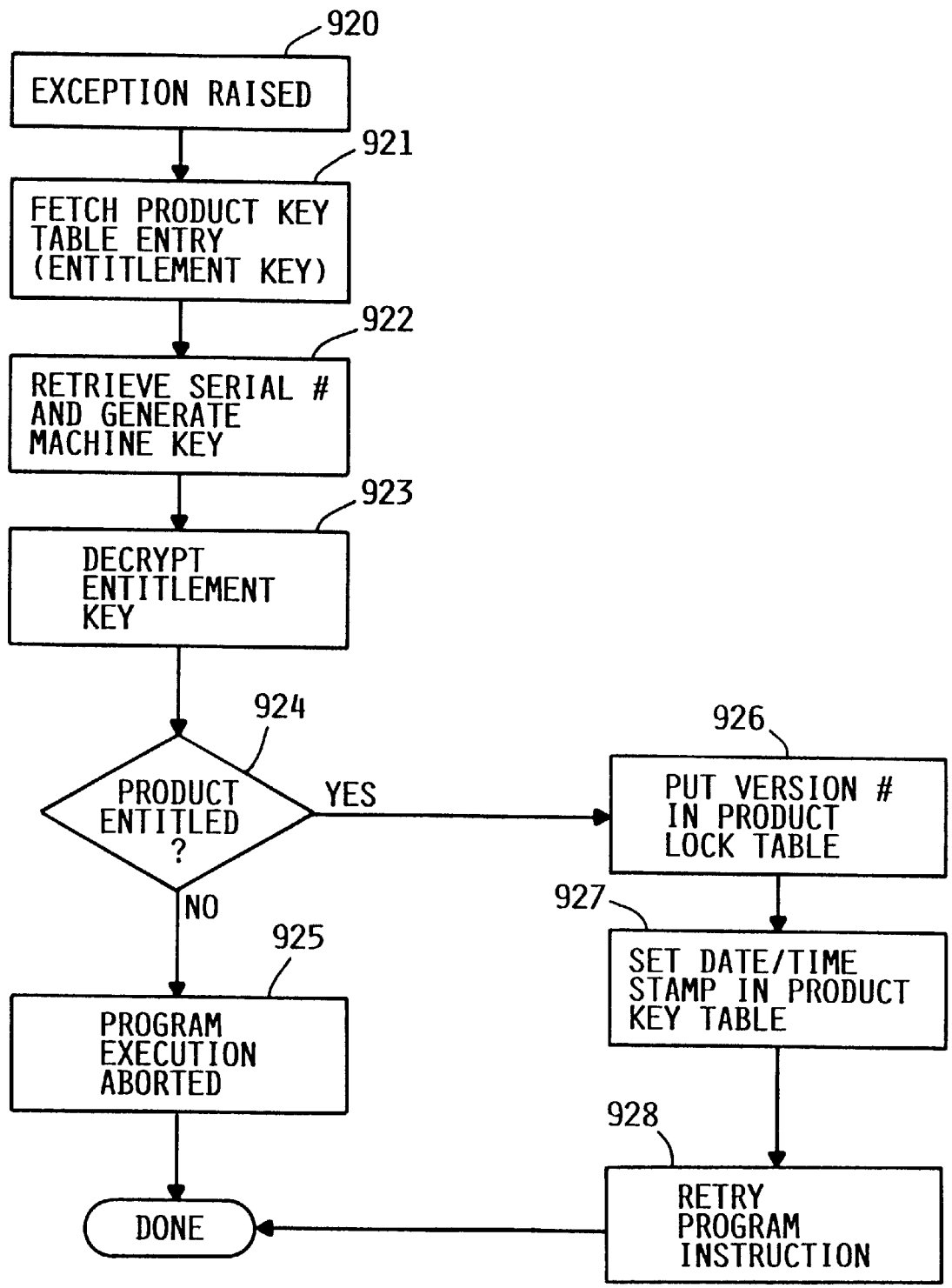

The process for receiving entitlement key 111 and maintaining product lock table 460 on computer system 101 is shown in FIG. 9. A customer enters entitlement key 111 into computer system 101 via console 109 at step 901. If this is an initial installation, install input routine 440 interacts with the operator to receive the input; otherwise general input routine 441 receives the input. The entitlement key is passed to unlock routine 430, which handles the decoding process. Unlock routine 430 causes get machine key function 420 to retrieve the machine serial number and generate the machine key at 902. Unlock routine 430 then uses the machine key to decode the entitlement key 111 at step 903. Unlock routine then rebuilds encoded product key table 450 at step 904, as described below. The decoded entitlement key takes the form shown in FIG. 2. It includes an 80-bit product entitlement flag array 205 indicating, for each product number, whether the product is unlocked under the new entitlement key. The new entitlement key is viewed as a replacement key for all products it unlocks. Unlock routine 430 scans each product entitlement flag 205 in the decoded key (step 904). If the product entitlement flag is set to '1' (indicating entitlement) at step 905, the corresponding entry in product key table 450 is replaced with the new entitlement key, version number, and charge group value at step 908. The entitlement bit field 506 is set to '1', and the date/time stamp field 503 is set to a zero value to indicate that the entitlement key has not yet been used. If the product entitlement flag of the new key is '0' the new entitlement key has no effect unless the version number and charge group number are the same as those stored in product key table 450. If the version and charge group number are the same (step 906), the entitlement key has the effect of locking the product. Unlock routine 430 will therefore invoke set lock function 421 to set the version number in product lock table 460 to '0' at step 907, and replace the corresponding entry in product key table 450 with the new entitlement key values at step 908. When table 450 has been rebuilt, its contents are saved in storage at step 909.

Unless a previously entitled product is unentitled, the rebuilding of table 450 has no immediate effect on product lock table 460. Products are unlocked on demand. Upon first execution of a previously unentitled software product, an exception is generated by the system when a triggering instruction is encountered. Exception handling routine 432 then calls unlock routine 430 to attempt to unlock the product at step 920. Unlock routine 430 then fetches the encrypted entitlement key from the appropriate entry in encoded product key table 450 at step 921, obtains the machine key at step 922, and decodes the entitlement key at step 923. If entitlement is indicated (step 924), set lock function 421 is invoked to set the version number in the entry 601 in product lock table 460 corresponding to the product number of the software product at step 926. At the same time, unlock routine 430 records the date and time of first use in date/time stamp field 503 at step 927. The triggering instruction is then retried and program execution continues at step 928. If entitlement is not indicated at step 924, program execution aborts at step 925.

Product lock table 460, being stored in RAM, will not survive system re-initialization. During re-initialization ("IPL"), IPL reverify locks routine 431 is called. to rebuild the product lock table. This routine will get the machine key as described above, and systematically decode each entitlement key entry in encoded product key table 450 to verify entitlement and rebuild the corresponding entry in product lock table 460.

Figure 10:
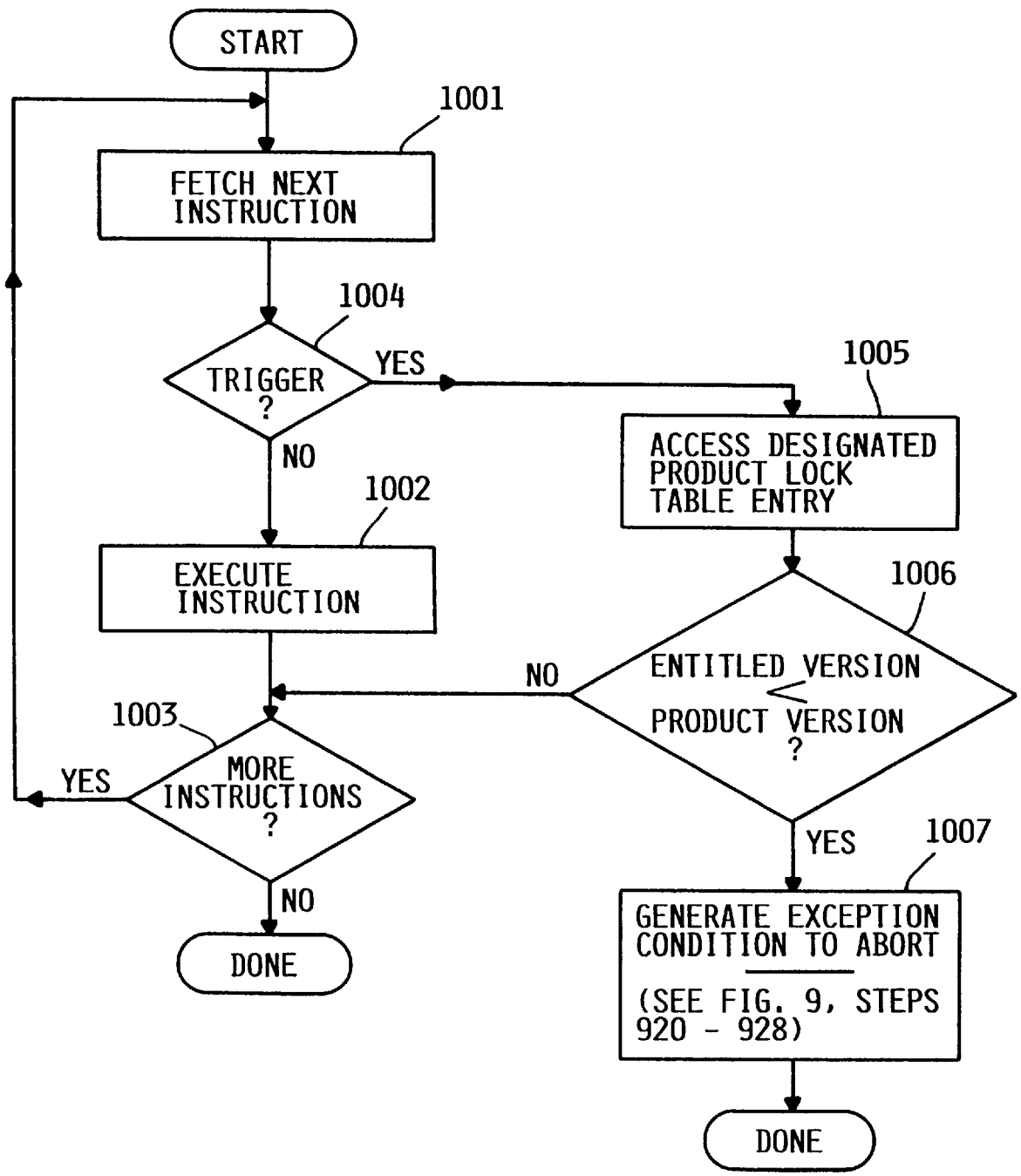
FIG. 10 is a block diagram of the steps required to verify entitlement during execution of a software module according to the preferred embodiment.

The process for executing a software module according to the preferred embodiment is shown in FIG. 10. System 101 executes the module by fetching (step 1001) and executing (step 1002) object code instructions until done (step 1003). If any instruction is an entitlement verification triggering instruction 301 (step 1004) check lock function 422 is invoked. Check lock function 422 accesses the product lock table entry 601 corresponding to the product number contained in the triggering instruction at step 1005. If the version number in product lock table 460 is equal to or greater than the version number 303 contained in triggering instruction 301, the software is entitled to execute (step 1006). In this case, check lock function 422 takes no further action, and the system proceeds to execute the next object code instruction in the software module. If the software is not entitled, check lock function generates an exception condition, causing control to pass to exception handler 432, which will terminate program execution (step 1007). The system does not save the results of an entitlement check which shows that the software is entitled. Therefore, when a triggering instruction is again encountered in the software module, the system again verifies entitlement as described above.

In alternative embodiments, additional sophistication could be defined for the entitlement verification triggering instructions to enable their being injected into the object code through a traditional compilation path. This would be one where the machine interface available to customers and compiler writers is that same set of executable instructions in which the object code form of a module is executed by the system. For support of such a traditional compilation path where the object code format is known by customers, additional barriers to patching of the object code to nullify or alter the entitlement triggering instructions may be appropriate. One such additional barrier would be to define the entitlement triggering instruction to simultaneously perform some other function. In this case, it is critical that the alternative function performed by the triggering instruction can not be performed by any other simple instruction. The alternative function must be so selected that any compiled software module will be reasonably certain of containing a number of instructions performing the function. If these criteria are met, the compiler can automatically generate the object code to perform the alternative function (and simultaneously, the entitlement verification trigger) as part of its normal compilation procedure. This definition would provide a significant barrier to patching of the object code to nullify the entitlement triggering instructions. Another alternative embodiment is to define that the entitlement triggering instruction must be positioned in the object code with an addressability alignment that has a simple relationship to the product number that it identifies. It should be a relatively simple matter for a compiler to inject the instructions at the proper code alignment as part of the normal compilation process and a simple matter for the instruction implementation to perform this additional verification. This definition would provide a significant barrier to patching of the object code to alter the identity of the product number supplied in the entitlement triggering instructions.

In the preferred embodiment, provision is made for 80 independent product numbers. It should be understood that the actual number of product numbers supported according to this invention is variable. It is anticipated in the preferred embodiment that the number of separately compilable software modules distributed by the distributor may well exceed 80 by a large factor. The number of product numbers corresponds to the number of separately priced software packages offered by the distributor's marketing organization. While each software module has only one product number, there may be many software modules sharing that product number. For example, the distributor may offer a word processing package, which includes separate software modules to handle screen editing, spell checking, document formatting, etc. If these software modules are always licensed as part of the word processing package, they would have a common product number. In an alternative embodiment, it would be possible to have a separate number for each software module.

In the preferred embodiment, software is licensed for a one-time charge, although additional charges can be made for maintenance upgrades. In an alternative embodiment, software can be licensed for a period of time. In this alternative embodiment, the entitlement key will contain an additional field indicating a length of time for which software is licensed. IPL reverify locks routine 431 will be called periodically to compare the date/time stamp associated with a product number in encoded product key table 450 with the length of time of the license, to determine whether the license has expired. If a license has expired, the corresponding unlock bit in product lock table 460 will be set to '0', preventing further execution of the software until additional entitlement is obtained.

Although a specific embodiment of the invention has been disclosed along with certain alternatives, it will be recognized by those skilled in the art that additional variations in form and detail may be made within the scope of the following claims.

What is claimed is:

1. An apparatus for controlling the use of a software module executing on a computer system, said computer system comprising:

means for granting entitlement for said computer system to execute said software module, said software module being a program unit that is discrete and identifiable with respect to compiling, combining with other units, and loading;

a plurality of independent triggering means in said software module for triggering entitlement verification;

entitlement verification means, responsive to each of said plurality of independent triggering means, for verifying that said computer system has entitlement to execute said software module; and means, responsive to said entitlement verification means, for aborting execution of said software module if said entitlement verification means determines that said computer system lacks entitlement to execute said software module.

2. The apparatus for controlling the use of a software module of claim 1, wherein each of said plurality of independent triggering means is a single object code instruction which triggers said entitlement verification means.

3. The apparatus for controlling the use of a software module of claim 2, wherein said object code instruction which triggers said entitlement verification means also causes said computer system to perform an additional function required for proper execution of said software module concurrently with verifying that said computer system has entitlement to execute said software module, whereby if said software module is modified by removing said object code instruction, said additional function required for proper execution of said software module will not be performed.

4. The apparatus for controlling the use of a software module of claim 2, wherein said object code instruction which triggers said entitlement verification means contains a product number for said software module.

5. The apparatus for controlling the use of a software module of claim 4, wherein said entitlement verification means comprises:

a product lock table in said computer system, said product lock table comprising a plurality of entries containing entitlement information, wherein each of said plurality of entries is associated with a product number; and means, responsive to said object code instruction, for accessing entitlement information contained in an entry in said product lock table associated with said product number contained in said object code instruction.

6. The apparatus for controlling the use of a software module of claim 1, wherein said means for granting entitlement for said computer system to run said software module comprises:

means for generating an entitlement key consisting of data; and means for inputting said entitlement key into said computer system.

7. The apparatus for controlling the use of a software module of claim 6, wherein said computer system contains a unique identifier, wherein said means for generating an entitlement key uses said unique identifier to generate said entitlement key, and wherein said entitlement key grants entitlement to run software only on a computer system containing the same unique identifier.

8. The apparatus for controlling the use of a software module of claim 7, further comprising:

means for encrypting said entitlement key using said unique identifier, wherein the resultant encrypted entitlement key may be decrypted only on a computer system having the same unique identifier;

means in said computer system for accessing the unique identifier of said computer system; and means in said computer system, responsive to said means for accessing said unique identifier, for decrypting said encrypted entitlement key.

9. A method for controlling the use of a software module executing on a computer system, said software module comprising a plurality of object code instructions, said method comprising the steps of:

granting entitlement for said computer system to execute said software module, said software module being a program unit that is discrete and identifiable with respect to compiling, combining with other units, and loading;

placing in said software module a plurality of independent triggering means for triggering entitlement verification;

executing object code instructions contained in said software module;

triggering an entitlement verification in said computer system to verify that said computer system has entitlement to execute said software module whenever one of said plurality of independent triggering means is encountered during execution of said object code instructions contained in said software module;

aborting execution of said software module if said entitlement verification determines that said computer system lacks entitlement to execute said software module.

10. The method for controlling the use of a software module of claim 9, wherein said step of placing in said software module a plurality of independent triggering means comprising placing, at each of a plurality of separate locations in said software module, a single object code instruction which triggers said entitlement verification.

11. The method for controlling the use of a software module of claim 10, wherein said object code instruction which triggers said entitlement verification also causes said computer system to perform an additional function required for proper execution of said software module concurrently with verifying that said computer system has entitlement to execute said software module, whereby if said software module is modified by removing said object code instruction, said additional function required for proper execution of said software module will not be performed.

12. The method for controlling the use of a software module of claim 10, wherein said object code instruction which triggers said entitlement verification contains a product number for said software module.

13. The method for controlling the use of a software module of claim 12, further comprising the step of:

maintaining a product lock table in said computer system, said product lock table comprising a plurality of entries containing entitlement information, wherein each of said plurality of entries is associated with a product number; and wherein said step of triggering an entitlement verification comprises accessing entitlement information contained in an entry in said product lock table associated with said product number contained in said object code instruction.

14. The method for controlling the use of a software module of claim 9, further comprising the steps of:

generating an entitlement key consisting of a plurality of data bits, said entitlement key providing information enabling said computer system to determine whether or not it has entitlement to execute said software module; and inputting said entitlement key into said computer system.

15. The method for controlling the use of a software module of claim 14, wherein said computer system contains a unique identifier, wherein said step of generating an entitlement key uses said unique identifier to generate said entitlement key, and wherein said entitlement key grants entitlement to run software only on a computer system containing the same unique identifier.

16. A program product apparatus for controlling entitlement, wherein said program product apparatus executes on a computer system having means for receiving entitlement to execute a software module, and having entitlement verification means responsive to triggering means in said software module for verifying that said computer system has entitlement to execute said software module, said program product apparatus comprising:

at least one software module recorded on recording media, said software module being a program unit that is discrete and identifiable with respect to compiling, combining with other units, and loading; and a plurality of independent triggering means in said software module for triggering said entitlement verification means on said computer system.

17. The program product apparatus for controlling entitlement of claim 16, wherein each of said plurality of independent triggering means is a single object code instruction which triggers said entitlement verification means.

18. The program product apparatus for controlling entitlement of claim 17, wherein said object code instruction which triggers said entitlement verification means also causes said computer system to perform an additional function required for proper execution of said software module concurrently with verifying that said computer system has entitlement to execute said software module, whereby if said software module is modified by removing said object code instruction, said additional function required for proper execution of said software module will not be performed.

19. The program product apparatus for controlling entitlement of claim 17, wherein:

said object code instruction which triggers said entitlement verification means contains a product number for said software module;

said entitlement verification means on said computer system comprises a product lock table in said computer system, said product lock table comprising a plurality of entries containing entitlement information, wherein each of said plurality of entries is associated with a product number; and said entitlement verification means on said computer system further comprises means, responsive to said object code instruction, for accessing entitlement information contained in an entry in said product lock table associated with said product number contained in said object code instruction.

20. A method for distributing a software module, wherein said software module is capable of executing on any one of a plurality of computer systems, each of said computer systems having means for receiving entitlement to execute said software module, and having entitlement verification means responsive to triggering means in said software module for verifying that said computer system has entitlement to execute said software module, said method comprising the steps of:

placing in said software module a plurality of independent triggering means for triggering said entitlement verification means, said software module being a program unit that is discrete and identifiable with respect to compiling, combining with other units, and loading;

distributing a copy of said software module to each of said computer systems; and granting entitlement for at least one of said computer systems to execute said software module.

21. The method for distributing a software module of claim 20, wherein said step of placing in said software module a plurality of independent triggering means comprises placing, at each of a plurality of separate locations in said software module, a single object code instruction which triggers said entitlement verification means.

22. The method for distributing a software module of claim 21, wherein said object code instruction which triggers said entitlement verification also causes said computer system to perform an additional function required for proper execution of said software module concurrently with verifying that said computer system has entitlement to execute said software module, whereby if said software module is modified by removing said object code instruction, said additional function required for proper execution of said software module will not be performed.

23. The method for distributing a software module of claim 21, wherein:

said object code instruction which triggers said entitlement verification means contains a product number for said software module;

said entitlement verification means on said computer system comprises a product lock table in said computer system, said product lock table comprising a plurality of entries containing entitlement information, wherein each of said plurality of entries is associated with a product number; and said entitlement verification means on said computer system further comprises means, responsive to said object code instruction, for accessing entitlement information contained in an entry in said product lock table associated with said product number contained in said object code instruction.

24. The method for distributing a software module of claim 20, wherein said step of granting entitlement for said computer system to execute said software module comprises the steps of:

generating an entitlement key consisting of a plurality of data bits, said entitlement key providing information enabling said computer system to determine whether or not it has entitlement to execute said software module; and transmitting said entitlement key to said computer system.

25. The method for controlling the use of a software module of claim 24, wherein said computer system contains a unique identifier, wherein said step of generating an entitlement key uses said unique identifier to generate said entitlement key, and wherein said entitlement key grants entitlement to run software only on a computer system containing the same unique identifier.

26. The method for controlling the use of a software module of claim 20, wherein:

said step of distributing said software module comprises distributing a plurality of software modules, each having a plurality of independent triggering means for triggering entitlement verification, on a single recording medium; and said step of granting entitlement for said computer system to execute said software module comprises granting separate entitlement to at least two of said plurality of software modules on said single recording medium.

* * * * *